(12) United States Patent
Collins

(10) Patent No.: US 11,814,268 B2
(45) Date of Patent: Nov. 14, 2023

(54) COMPONENT LIFTS HAVING SUPPORT ASSEMBLIES

(71) Applicant: Toyota Motor Engineering & Manufacturing North America, Inc., Plano, TX (US)

(72) Inventor: Jeffrey M. Collins, Davisburg, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 85 days.

(21) Appl. No.: 17/402,096

(22) Filed: Aug. 13, 2021

(65) Prior Publication Data

US 2023/0049994 A1    Feb. 16, 2023

(51) Int. Cl.
| | |
|---|---|
| B66C 1/66 | (2006.01) |
| B66C 1/44 | (2006.01) |
| B66C 23/48 | (2006.01) |
| B66D 3/26 | (2006.01) |
| B60S 5/06 | (2019.01) |
| B66D 3/20 | (2006.01) |

(52) U.S. Cl.
CPC ............... B66C 1/66 (2013.01); B66C 1/442 (2013.01); *B60S 5/06* (2013.01); *B66C 23/485* (2013.01); *B66D 3/20* (2013.01); *B66D 3/26* (2013.01); *B66D 2700/025* (2013.01)

(58) Field of Classification Search
CPC ........... B66C 1/66; B66C 1/442; B66C 1/585; B66D 2700/025; B66D 3/20

USPC ................................... 294/118, 110.1, 110.2
See application file for complete search history.

(56) References Cited

U.S. PATENT DOCUMENTS

| | | | | |
|---|---|---|---|---|
| 1,246,142 | A * | 11/1917 | Morris | E01B 29/04 294/111 |
| 1,455,020 | A * | 5/1923 | Collins | B25B 27/0035 294/87.24 |
| 1,510,176 | A * | 9/1924 | Stanley | B66C 1/422 294/902 |
| 2,378,570 | A * | 6/1945 | Mitchell | B66C 1/422 294/81.61 |
| 2,705,658 | A * | 4/1955 | Barchoff | B66C 1/422 294/902 |
| 2,705,659 | A * | 4/1955 | Barchoff | B66C 1/422 294/902 |
| 3,169,034 | A * | 2/1965 | Epstein | B65G 7/12 29/268 |

(Continued)

FOREIGN PATENT DOCUMENTS

| | | |
|---|---|---|
| CN | 205220632 U | 5/2016 |
| CN | 206416980 U | 8/2017 |

(Continued)

*Primary Examiner* — Paul T Chin
(74) *Attorney, Agent, or Firm* — Dinsmore & Shohl LLP

(57) ABSTRACT

A support assembly including a coupler, a first arm having a proximate end movably coupled to the coupler, a distal end opposite the proximate end, and a second arm having a proximate end movably coupled to the coupler, a distal end opposite the proximate end. The support assembly is movable between a disengaged position and an engaged position. When moving from the disengaged position to the engaged position, the distal end of the first arm and the distal end of the second arm move toward each other.

7 Claims, 3 Drawing Sheets

(56) References Cited

U.S. PATENT DOCUMENTS

| | | | | | |
|---|---|---|---|---|---|
| 3,348,872 | A | * | 10/1967 | Kolinski | B66C 1/585 |
| | | | | | 294/110.1 |
| 5,280,982 | A | * | 1/1994 | Kobayashi | B66C 1/54 |
| | | | | | 294/116 |
| 5,693,113 | A | * | 12/1997 | Dries | C03B 35/125 |
| | | | | | 65/239 |
| 6,012,752 | A | * | 1/2000 | Douglas | B66C 1/422 |
| | | | | | 294/119 |
| 6,331,025 | B1 | * | 12/2001 | Douglas | B66C 1/442 |
| | | | | | 294/110.1 |
| 7,344,171 | B1 | * | 3/2008 | McMullan | E01H 1/1206 |
| | | | | | 294/902 |
| 7,693,113 | B2 | * | 4/2010 | Timmerman | H04B 1/7105 |
| | | | | | 370/335 |
| 8,366,162 | B2 | * | 2/2013 | Imlach | B66C 1/30 |
| | | | | | 294/118 |
| 9,763,459 | B2 | * | 9/2017 | Hazenbroek | A22C 21/0007 |

FOREIGN PATENT DOCUMENTS

| | | |
|---|---|---|
| CN | 209938562 U | 1/2020 |
| CN | 211965294 U | 11/2020 |
| CN | 213036899 U | 4/2021 |
| KR | 200481551 Y1 | 10/2016 |
| KR | 101704718 B1 | 2/2017 |

* cited by examiner

COMPONENT LIFTS HAVING SUPPORT ASSEMBLIES

TECHNICAL FIELD

The present specification generally relates to component lifts and, more specifically, component lifts including a support assembly for lifting a component.

BACKGROUND

Vehicle batteries can be cumbersome to move into a desired position, and may require the use of a lifting mechanism to lift and remove the vehicle batteries. Traditional lifting mechanisms use actuator-operated lifting arms to engage and maintain a vehicle battery with the lifting mechanism. However, these lifting mechanisms require electrical power to grip and to maintain the vehicle batteries.

Accordingly, a need exists for alternative lifting mechanisms for lifting and moving a vehicle battery.

SUMMARY

A support assembly including a coupler, a first arm having a proximate end movably coupled to the coupler, a distal end opposite the proximate end, and a second arm having a proximate end movably coupled to the coupler, a distal end opposite the proximate end. The support assembly is movable between a disengaged position and an engaged position. When moving from the disengaged position to the engaged position, the distal end of the first arm and the distal end of the second arm move toward each other.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
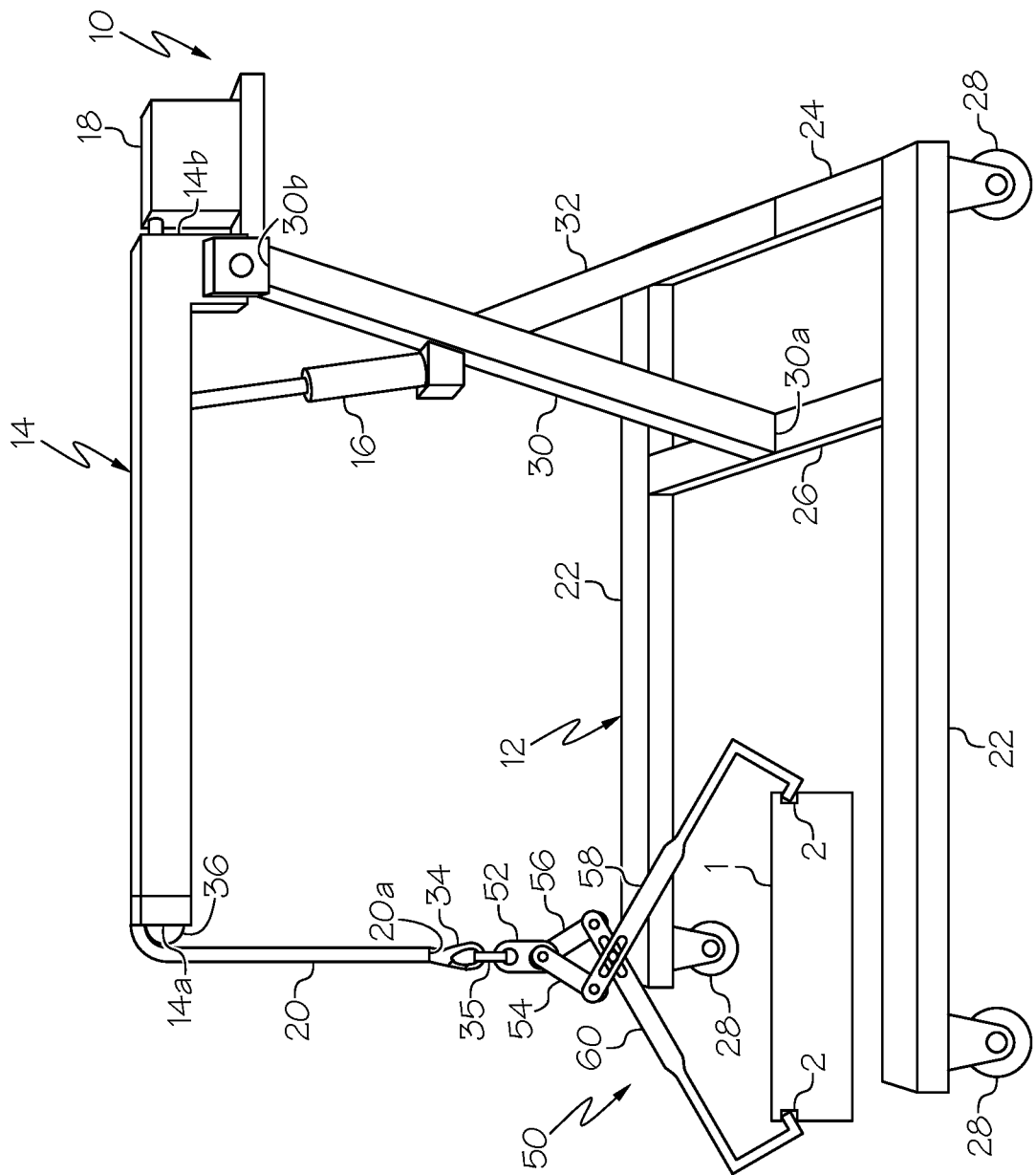
FIG. 1 schematically depicts a perspective view of a vehicle battery lift including a support assembly, according to one or more embodiments shown and described herein.
Figure 2:
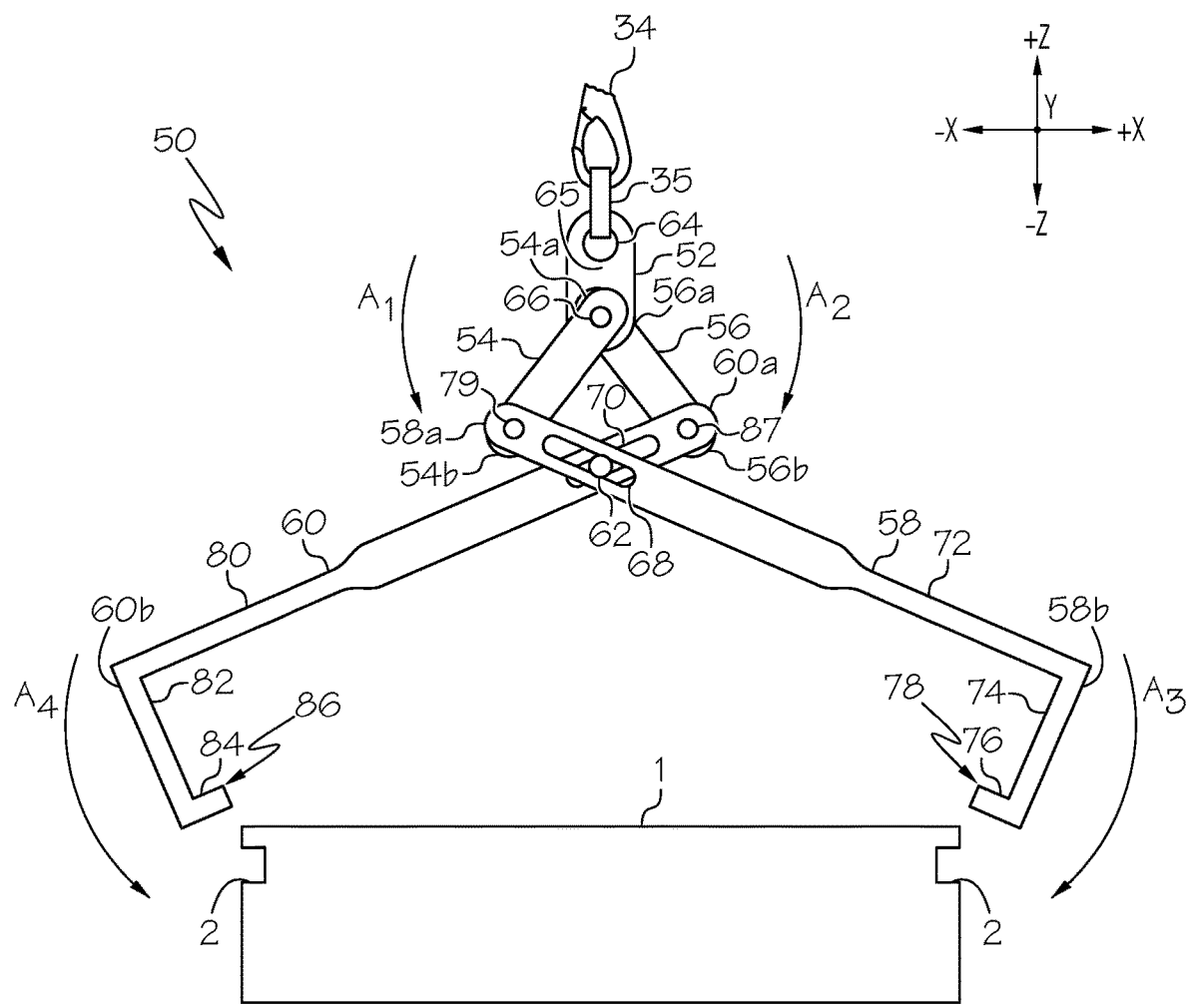
FIG. 2 schematically depicts a front view of the support assembly of FIG. 1 in a disengaged position, according to one or more embodiments shown and described herein.
Figure 3:
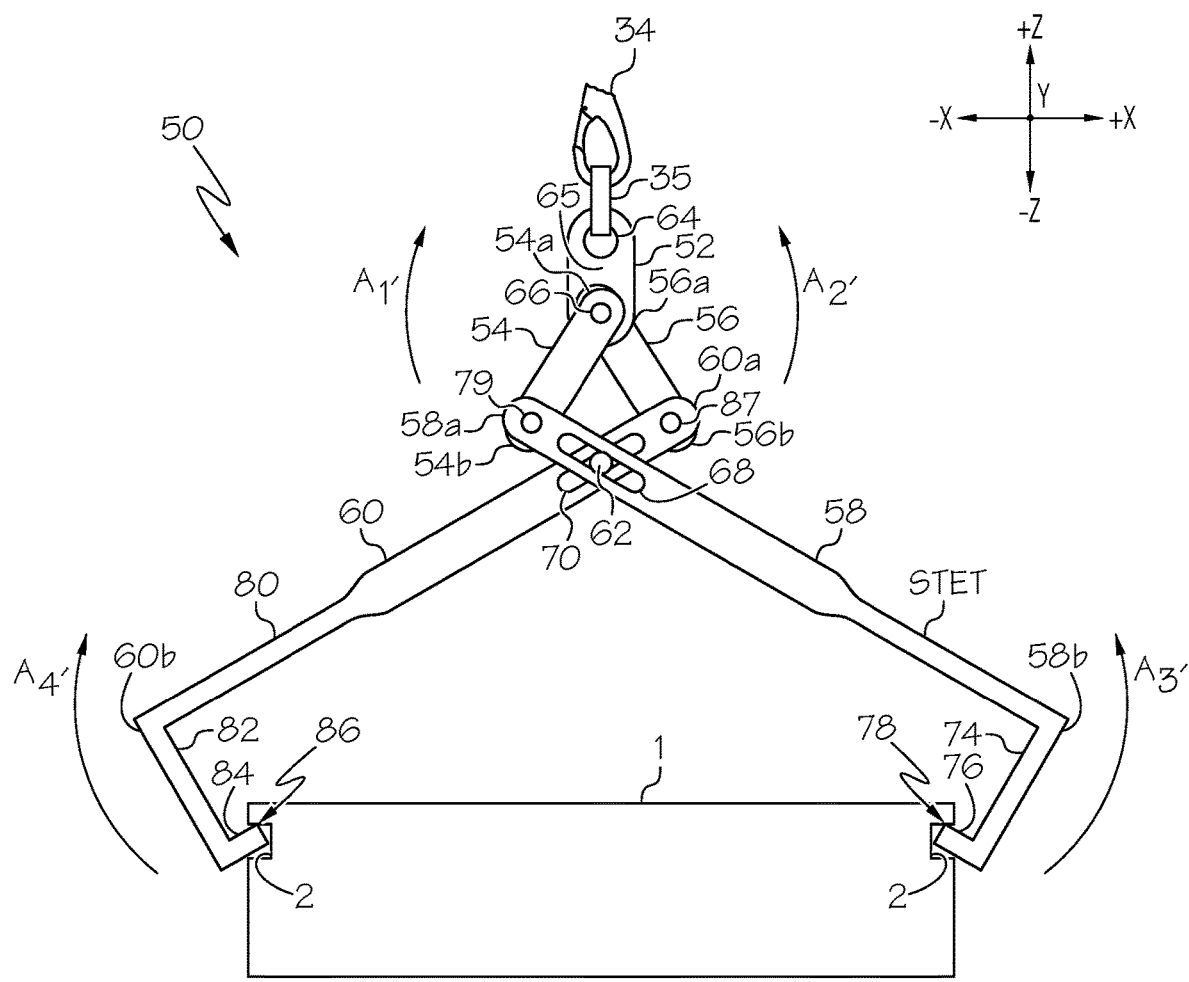
FIG. 3 schematically depicts a front view of the support assembly of FIG. 1 in an engaged position, according to one or more embodiments shown and described herein.

FIGS. 1-3 generally depict a component lift that is configured to lift a component utilizing a support assembly that mechanically grips and holds the component as the support assembly is lifted upward. The component lift generally includes a base, a boom, an actuator, a motor, a strap, and a support assembly. The support assembly generally includes a first link, a first arm pivotally coupled to the first link, a second link, and a second arm pivotally coupled to the second link. The first arm and the second arm each include a seat, and are configured to grip the component via the corresponding seats. The first arm and the second arm include a slot extending along a length of each of the first arm and the second arm. A pin may extend between the slots in each of the first arm and the second arm. The pin may limit the movement of the first arm and second arm such that the first arm and the second arm move in conjunction in an assembly vertical direction. The support assembly moves between a disengaged position and an engaged position. In the disengaged position, the seats are spaced apart from the component. In the engaged position, the seats engage the component so as to grip and maintain the component.

As used herein, the term "lateral direction" refers to the +/−X directions of the support assembly, as depicted, for example, in FIGS. 1-3. The term "vertical direction" refers to the +/−Z directions of the support assembly, as depicted, for example, in FIGS. 1-3.

Referring now to FIG. 1, a component lift 10 is depicted. The component lift 10 is configured to hold, lift, and move a component 1. It should be appreciated that the component 1 may be any liftable component. The component 1 may be any component on a vehicle such as, for example, a motor, an engine, a frame, or the like. For example, the component 1 may be a vehicle battery 1, and will be referred to as such throughout the ensuing description. The vehicle battery 1 may include a pair of grooves 2 formed therein that are configured to receive a portion of the component lift 10 to allow the component lift 10 to more easily engage and maintain the vehicle battery 1. The component lift 10 may include a base 12, a boom 14, an actuator 16, a motor 18, an elongated flexible connector 20, and a support assembly 50. The base 12 may include a pair of legs 22, a rear beam 24, a mid-section beam 26, a plurality of wheels 28, an upright member 30, and a support member 32. The rear beam 24 may extend between and be coupled to the pair of legs 22 at opposite ends of the rear beam 24. The mid-section beam 26 may extend between and be coupled to the pair of legs 22 at opposite ends of the mid-section beam 26. The plurality of wheels 28 may be rotatably coupled to the base 12 to allow the base 12 to be movable about a surface (not shown). The upright member 30 may extend in an assembly vertical direction (e.g., in the +/−Z direction) from the mid-section beam 26. The upright member 30 may include a first end 30a coupled to the mid-section beam 26 and an opposite second end 30b. The support member 32 may extend from the rear beam 24 in the assembly vertical direction at an angle oblique to the upright member 30 to contact and couple to the upright member 30. The boom 14 may include a first end 14a and an opposite second end 14b. The second end 14b of the boom 14 may be pivotally coupled to the second end 30b of the upright member 30.

The actuator 16 may be coupled to the upright member 30 between the first end 30a and the second end 30b. The actuator 16 may additionally be coupled to the boom 14 between the first end 14a and the second end 14b. The actuator 16 may be a linear actuator, such as, for example, a hydraulic cylinder. The actuator 16 may be configured to extend and retract from the upright member 30 to pivot the boom 14, thereby moving the first end 14a of the boom 14 in the vertical direction.

The boom 14 may include a roller 36 rotatably coupled to the first end 14a. The elongated flexible connector 20 may include a first end 20a, and a hook 34 coupled to the first end 20a of the elongated flexible connector 20. The elongated flexible connector 20 may be operatively coupled to the motor 18 at an end opposite the first end 20a. The elongated flexible connector 20 may extend from the motor 18, along the boom 14, and across the roller 36 to extend downward in the assembly vertical direction from the roller 36. The motor 18 may be a winch, such that the motor 18 may take up and pay out the elongated flexible connector 20. In other words, the motor 18 may rotate to wind up or unwind the elongated flexible connector 20 to move the elongated flexible connector 20 along the boom 14, and thereby raise or lower the hook 34. The motor 18 may be electric or hand-powered, such as, for example, a hand-operated winch. The elongated flexible connector 20 may be, for example, a strap, a wire, a chain, a rope, a webbing, a belt, a braided metal cord, or the like.

Referring to FIGS. 1-3, the support assembly 50 may include a coupler 52, a first link 54, a second link 56, a first arm 58, a second arm 60, and a pin 62. The coupler 52 may include a coupling opening 64 and a main body portion 65 spaced apart from the coupling opening 64. The hook 34 may extend through the coupling opening 64 to couple to the coupler 52. The hook 34 may be configured to be selectively coupled to the coupler 52 by extending through the coupling opening 64. The hook 34 may be directly coupled to the coupler 52, or may include an intermediary member 35 that is positioned between the hook 34 and the coupler 52, and couples the hook 34 to the coupler 52. The first link 54 may include a proximal end portion 54a, and a distal end portion 54b opposite the proximal end portion 54a. The second link 56 may include a proximal end portion 56a, and a distal end portion 56b opposite the proximal end portion 56a. A first pivot member 66 may extend through the proximal end portion 54a of the first link 54, the proximal end portion 56a of the second link 56, and the main body portion 65 of the coupler 52 to pivotally couple the proximal end portion 54a of the first link 54 and the proximal end portion 56a of the second link 56 to the coupler 52. The coupler 52 may be positioned between the first link 54 and the second link 56, such that the first link 54 and the second link 56 are coupled to the coupler 52 on opposing sides of the coupler 52. However, the first link 54 and the second link 56 may be coupled to the coupler 52 on the same side of the coupler 52. The coupler 52, the first link 54, the second link 56, the first arm 58, and the second arm 60 may be formed of, but not limited to, a metal, such as aluminum or steel, a resin, a plastic, PVC, or the like. The coupler 52, the first link 54, the second link 56, the first arm 58, and the second arm 60 may be formed of the same material, or of different materials.

The first arm 58 may include a proximate end 58a, a distal end 58b opposite the proximate end 58a, a first slot 68 positioned between the proximate end 58a and the distal end 58b of the first arm 58, a first elongated body 72, and a first extension 74 extending perpendicularly from the first elongated body 72. In embodiments, the first extension 74 may extend from the first elongated body 72 at an oblique angle. The distal end portion 54b of the first link 54 may be pivotally coupled to the proximate end 58a of the first arm 58 via a second pivot member 79, thereby movably coupling the first arm 58 to the coupler 52. The proximate end 58a of the first arm 58 may be movably coupled to the coupler 52. The first extension 74 of the first arm 58 may include a first tab 76 that extends in parallel to the first elongated body 72 of the first arm 58 toward the proximate end 58a of the first arm 58. In embodiments, the first tab 76 may extend at an angle oblique to the first elongated body 72. A first seat 78 may be defined by the first extension 74 and the first tab 76 of the first arm 58. The first seat 78 may be configured to engage the vehicle battery 1. In embodiments, the first seat 78 may be sized and shaped to extend into one of the grooves 2 of the vehicle battery 1.

The second arm 60 may include a proximate end 60a, a distal end 60b opposite the proximate end 60a, a second slot 70 positioned between the proximate end 60a and the distal end 60b of the second arm 60, a second elongated body 80, and a second extension 82 extending perpendicularly from the second elongated body 80. In embodiments, the second extension 82 may extend from the second elongated body 80 at an oblique angle. The distal end portion 56b of the second link 56 may be pivotally coupled to the proximate end 60a of the second arm 60 via a third pivot member 87, thereby movably coupling the second arm 60 to the coupler 52. The proximate end 60a of the second arm 60 may be movably coupled to the coupler 52. The second extension 82 of the second arm 60 may include a second tab 84 that extends in parallel to the second elongated body 80 of the second arm 60 toward the proximate end 60a of the second arm 60. In embodiments, the second tab 84 may extend at an angle oblique to the second elongated body 80. A second seat 86 may be defined by the second extension 82 and the second tab 84 of the second arm 60. The second seat 86 may be configured to engage the vehicle battery 1. In embodiments, the second seat 86 may be sized and shaped to extend into one of the grooves 2 of the vehicle battery 1.

The pin 62 may extend through the first slot 68 of the first arm 58 and the second slot 70 of the second arm 60 to movably couple the first arm 58 to the second arm 60. The pin 62 constrains the movement of each of the first arm 58 and the second arm 60. The pin 62 is configured to move throughout the first slot 68 of the first arm 58 and the second slot 70 of the second arm 60 as the first arm 58 and the second arm 60 pivot about the first link 54 and the second link 56, respectively. The first arm 58 and the second arm 60 are movably coupled to one another via the pin 62 such that the first link 54, the second link 56, the first arm 58, and the second arm 60 act as a four-link system, that moves and pivots the first arm 58 and the second arm 60 relative to the coupler 52. The pin 62 may be formed of, for example, a metal, such as aluminum or steel, a plastic, a resin, PVC, or the like.

Referring now to FIGS. 2 and 3, the support assembly 50 may move between a disengaged position (FIG. 2) and an engaged position (FIG. 3). Referring to FIG. 2, in the disengaged position, the first seat 78 and the second seat 86 are spaced apart from the grooves 2 of the vehicle battery 1. Referring to FIG. 3, in the engaged position, the first seat 78 and the second seat 86 are positioned within the grooves 2 of the vehicle battery 1 such that the first seat 78 and the second seat 86 engage and maintain the vehicle battery 1 between the first arm 58 and the second arm 60.

Referring again to FIG. 2, when moving from the disengaged position to the engaged position, the first link 54 pivots relative to the coupler 52 in the direction of arrow A1 about the first pivot member 66, the second link 56 pivots relative to the coupler 52 in the direction of arrow A2 about the first pivot member 66, the first arm 58 pivots in the direction arrow A3 about the second pivot member 79, and the second arm 60 pivots in the direction of arrow A4 about the third pivot member 87. The support assembly 50 moves such that a distance between the proximate end 58a of the first arm 58 and the proximate end 60a of the second arm 60 in the engaged position is less than a distance between the proximate end 58a of the first arm 58 and the proximate end 60a of the second arm 60 in the disengaged position. Further, a distance between the coupler 52 and the pin 62 in the engaged position is greater than a distance between the coupler 52 and the pin 62 in the disengaged position.

The first link 54 and the second arm 60 pivot in the same direction, the second link 56 and the first arm 58 pivot in the same direction, and the first link 54 and second arm 60 pivot in the opposite direction of the second link 56 and the first arm 58. The opposite rotation of the first link 54 and the first arm 58, and the opposite rotation of the second link 56 and the second arm 60 move the first arm 58 and the second arm 60 in the vertical direction (e.g., in the +/−Z direction) while pivoting. When the first arm 58 and the second arm 60 pivot in the directions of arrow A3 about the second pivot member 79 and arrow A4 about the third pivot member 87, respectively, the rotation of the first link 54 in the direction of arrow A1 about the first pivot member 66 and the second link 56 in the direction of arrow A2 about the first pivot member 66 moves the first arm 58 and the second arm 60 away from the coupler 52 and toward the vehicle battery 1. The movement away from the coupler 52 results in a distance between the coupler 52 and the pin 62 in the engaged position being greater than a distance between the coupler 52 and the pin 62 in the disengaged position. Further, during rotation of the first arm 58 and the second arm 60, the pin 62 traverses the first slot 68 of the first arm 58 and the second slot 70 of the second arm 60. When moving from the disengaged position to the engaged position, the pin 62 traverses the first slot 68 toward the proximate end 58a of the first arm 58, and traverses the second slot 70 toward the proximate end 60a of the second arm 60.

The pin 62 constrains movement of the first arm 58 and second arm 60 relative to one another to allow the support assembly 50 to move toward the engaged position when a weight is applied to the first arm 58 and the second arm 60. When a force is applied to the first seat 78 and the second seat 86 in a direction extending from the coupler 52 to the first seat 78, the second seat 86, or in between, the force biases the support assembly 50 toward the engaged position. The biasing force allows the support assembly 50 to maintain the vehicle battery 1 between the first seat 78 and the second seat 86 by using the weight of the vehicle battery 1.

Referring to FIG. 3, when moving from the engaged position to the disengaged position, the first link 54 pivots relative to the coupler 52 in the direction of arrow A1' about the first pivot member 66, the second link 56 pivots relative to the coupler 52 in the direction of arrow A2' about the first pivot member 66, the first arm 58 pivots in the direction arrow A3' about the second pivot member 79, and the second arm 60 pivots in the direction of arrow A4' about the third pivot member 87. Each of the directions of arrows A1', A2', A3', and A4' are directed in the opposite direction of A1, A2, A3, and A4, respectively. The support assembly 50 pivots such that a distance between the proximate end 58a of the first arm 58 and the proximate end 60a of the second arm 60 in the engaged position is greater than a distance between the proximate end 58a of the first arm 58 and the proximate end 60a of the second arm 60 in the disengaged position.

When the first arm 58 and the second arm 60 pivot in the directions of arrow A3' about the second pivot member 79 and arrow A4' about the third pivot member 87, respectively, the rotation of the first link 54 in the direction of arrow A1' about the first pivot member 66 and the second link 56 in the direction of arrow A2' about the first pivot member 66 moves the first arm 58 and the second arm 60 toward the coupler 52 and away from the vehicle battery 1. Further, when moving from the disengaged position to the engaged position, the pin 62 traverses the first slot 68 toward the distal end 58b of the first arm 58, and traverses the second slot 70 toward the distal end 60b of the second arm 60.

The operation of the component lift 10 will now be described with reference to FIGS. 1-3. Referring initially to FIG. 2, the support assembly 50 may initially be in the disengaged position. When the support assembly 50 is in the disengaged position, the component lift 10 may be moved via the wheels 28 to position the vehicle battery 1 between the first seat 78 and the second seat 86 in the assembly lateral direction (e.g., in the +/−X direction). The component lift 10 may be moved by hand, or via an actuator. When the vehicle battery 1 is positioned between the seats 78, 86 in the assembly lateral direction, the support assembly 50 may be moved from the disengaged position to the engaged position. The support assembly 50 may be moved by hand, or via an actuator. For example, the arms 58, 60 of the support assembly 50 may be gripped by a user, and manipulated toward the engaged position, positioning the first seat 78 and the second seat 86 into the grooves 2 of the vehicle battery 1.

When in the engaged position, the motor 18 may be operated to take up the elongated flexible connector 20, thereby moving the hook 34 and the support assembly 50 in the assembly vertical direction toward the first end 14a of the boom 14. When the support assembly 50 is moved in the vertical direction such that the vehicle battery 1 is off of the ground, the weight of the vehicle battery 1 provides a force to the first arm 58 and the second arm 60 in a downward direction (e.g., in the −Y direction). The force on the first arm 58 and the second arm 60 moves the support assembly 50 toward the engaged position, with the first arm 58 pivoting in the A3 direction about the second pivot member 79 and the second arm 60 pivoting in the A4 direction about the third pivot member 87. The force allows the support assembly 50 to remain in the engaged position when in the engaged position, thereby maintaining the vehicle battery 1 between the first seat 78 and the second seat 86 by using the weight of the vehicle battery 1. Once the support assembly 50 is in the engaged position with the vehicle battery 1 off of the ground, the component lift 10 may be moved to transport the vehicle battery 1 to another location, or to maneuver the vehicle battery 1 during installation or maintenance.

When the vehicle battery 1 is repositioned by the component lift 10, the motor 18 may be operated to pay out the elongated flexible connector 20, thereby moving the hook 34 and the support assembly 50 in the downward direction (e.g., in the −Y direction) away from the boom 14. When the vehicle battery 1 is in a desired position, the support assembly 50 may be moved from the engaged position to the disengaged position by pivoting the first arm 58 in the direction of arrow A3' about the second pivot member 79 and the second arm 60 in the direction of arrow A4' about the third pivot member 87, thereby pivoting the first link in the direction of arrow A1' and the second link in the direction of arrow A2' about the first pivot member 66.

It should be appreciated that the vehicle battery may be for any vehicle, including, but not limited to, a car, a truck, a van, a boat, and an aircraft or spacecraft. It should additionally be appreciated that the vehicle battery may be for an electric vehicle, a hybrid vehicle, or the like. The vehicle battery lift may additionally be configured to lift various different components besides a battery, such as, for example, a motor. Further, the vehicle battery lift may be coupled to a vehicle, such as an autonomous or manually-driven vehicle, so that the vehicle may move the vehicle battery lift.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A support assembly comprising:
  a coupler;
  a pin;
  a first arm having a proximate end movably coupled to the coupler, a distal end opposite the proximate end, the first arm includes a first slot positioned between the proximate end and the distal end of the first arm;
  a second arm having a proximate end movably coupled to the coupler, a distal end opposite the proximate end, the second arm includes a second slot positioned between the proximate end and the distal end of the second arm;
  a first link having a proximal end portion pivotally coupled to the coupler and a distal end portion coupled to the proximate end of the first arm; and
  a second link having a proximal end portion pivotally coupled to the coupler and a distal end portion coupled to the proximate end of the second arm, wherein:
  the pin extends through the first slot and the second slot to movably couple the first arm to the second arm,
  the support assembly is movable between a disengaged position and an engaged position,
  when moving from the disengaged position to the engaged position, the distal end of the first arm and the distal end of the second arm move toward each other, and
  a distance between the proximate end of the first arm and the proximate end of the second arm in the engaged position is less than a distance between the proximate end of the first arm and the proximate end of the second arm in the disengaged position.

2. The support assembly of claim 1, wherein the first arm includes a first elongated body and a first extension extending perpendicularly from the first elongated body, a first seat is defined by the first extension, the second arm includes a second elongated body and a second extension extending perpendicularly from the second elongated body, and a second seat is defined by the second extension.

3. The support assembly of claim 2, wherein when moving between the engaged position and the disengaged position, the first arm pivots in a first direction and the first link pivots in a second direction opposite the first direction.

4. The support assembly of claim 3, wherein when moving between the engaged position and the disengaged position, the second arm pivots in a third direction and the second link pivots in a fourth direction opposite the third direction.

5. The support assembly of claim 4, wherein the first direction is opposite the third direction.

6. The support assembly of claim 5, wherein the first extension includes a first tab that extends in parallel to the first elongated body, and the second extension includes a second tab that extends in parallel to the second elongated body.

7. The support assembly of claim 6, wherein a distance between the coupler and the pin in the engaged position is greater than a distance between the coupler and the pin in the disengaged position.

* * * * *